United States Patent Office 3,804,845
Patented Apr. 16, 1974

3,804,845
MANUFACTURE OF BIPYRIDYLS
Geoffrey James Moore, Runcorn, England, assignor to Imperial Chemical Industries Limited, London, England
No Drawing. Filed June 19, 1972, Ser. No. 264,237
Claims priority, application Great Britain, June 24, 1971, 29,584/71
Int. Cl. C07d 31/42
U.S. Cl. 260—296 D                                             20 Claims

ABSTRACT OF THE DISCLOSURE

A process for the manufacture of 4,4'-bipyridyls and/or 2,2' - bipyridyls which comprises treating a 4-halopyridine or a 2-halopyridine with an alcohol in the presence of palladium and under basic conditions.

---

This invention relates to the manufacture of bipyridyls and particularly to a process for the manufacture of 4,4'-bipyridyls and 2,2'-bipyridyls from halopyridines.

It is well known, for example from U.K. patent specifications Nos. 956,854; 963,441; 1,016,541 and 1,030,154 that bipyridyls, notably 4,4'-bipyridyls, can be produced by reacting pyridine with a metal, for example sodium, magnesium or aluminum, to form a metal/pyridine interaction product, and subsequently oxidizing this interaction product. Also, in copending U.K. patent application No. 39,481/70 (MD. 23060) we have described a process for the manufacture of bipyridyls which comprises heating pyridine with a halogen, a 4-halopyridine or a 1-(4-pyridyl)-pyridinium salt at a temperature of at least 150° C., an embodiment of this process comprising heating pyridine with chlorine or bromine at a temperature in excess of 150° C. optionally in the presence of a metal halide for example palladium bromide.

We have now found that bipyridyls can be produced by treating halopyridines with alcohols in the presence of palladium, conveniently at a temperature below 150° C.

According to the present invention we provide a process for the manufacture of 4,4'-bipyridyls and/or 2,2'-bipyridyls which comprises treating a 4-halopyridine or a 2-halopyridine with an alcohol in the presence of palladium and under basic conditions.

By the term "halopyridine" as used throughout this specification we mean a halogenated pyridine containing one or more halogen atoms wherein the halogen is chlorine, bromine or iodine. The pyridine nucleus of the halopyridine may carry inert substituents, for example alkyl groups in any position not occupied by the halogen atom(s).

The process can be carried out simply by mixing a solution of the halopyridine in the alcohol containing palladium with a base at the desired temperature, for example from 0° C. to 150° C. Preferably the mixture is heated at a temperature of from 50° C. to 80° C. Conveniently the reaction can be carried out at the boiling point of the reaction mixture if desired under conditions of reflux.

The halopyridine may be generated in situ in the reaction mixture, for example by adding the hydrochloride of the halopyridine to a reaction mixture containing a strong base, for example an alkali-metal or alkaline earth metal hydroxide or an organic amine, for example an alkylamine such as triethylamine. An alcoholic solution of an alkali metal hydroxide is a convenient reaction medium and in this case the alcohol conveniently may be an alkanol, preferably an alkanol containing from one to six, especially from one to four carbon atoms, for example methanol.

The reaction medium may, and preferably does, contain water which may comprise an appreciable proportion of the reaction medium, for example up to 50% by weight of the reaction medium or even higher. The presence of water is believed to be beneficial because the water dissolves any alkali-metal halide formed and prevents fouling of the catalyst by this material.

The temperature at which the process of the invention is carried out can be for example from 0° C. to 150° C., although higher temperatures may be employed if the treatment is carried out under superatmospheric pressure in a sealed vessel.

We have found that the yield of bipyridyls can be increased by incorporating hydrazine or hydroxylamine or a derivative thereof into the reaction mixture and the process embodying this discovery constitutes a preferred embodiment of the invention. Examples of derivatives of hydrazine and hydroxylamine which may be employed are their salts and hydrates, for example hydrazine hydrochloride, sulphate or hydrate and hydroxylammonium chloride (hydroxylamine hydrochloride). The amount of hydrazine or hydroxylamine or derivatives thereof incorporated will usually be from 5% to 25% by weight of the halopyridine, preferably from 10% to 20% by weight of the halopyridine.

The palladium may be used in unsupported form, for example as palladium black, but we prefer to employ palladium supported on a suitable carrier. Any carrier conventionally used for supporting palladium may be employed, for example alkaline earth metal oxides and salts, such as carbonates and sulphates, and charcoal. Specific examples of alkaline earth metal oxides and salts which may be used are alumina, silica, silica-alumina, calcium carbonate and barium sulphate. The amount of palladium in the reaction mixture is not critical but usually will be from 0.025% to 2%, especially from 0.4% to 1.0% by weight, based on the halopyridine, although larger amounts may be used if desired. We have found that the efficiency of the palladium catalyst decreases during use due to pollution of the palladium. The activity of the catalyst may be restored in conventional manner, for example by heating the used palladium at elevated temperature in air. At the end of the reaction the palladium can be recovered for re-use by filtration.

The bipyridyls may be isolated from the reaction mixture in known manner, for example by adding water to the reaction mixture and allowing the bipyridyl to crystallize out, or by evaporating the mixture to remove the alcohol and any water present. The bipyridyl product may be purified by recrystallization from water. The process of the invention converts the halopyridine into essentially bipyridyls and pyridine and only very small amounts of other products are obtained. The reaction conditions can be selected so as to produce large yields of bipyridyls with minimum formation of pyridine. Pyridine formed during the reaction may be used to prepare halopyridines for use in the process so that overall loss of pyridine is low.

The 4,4'- and/or 2,2'-bipyridyls produced by the process of the invention are useful for conversion by quaternization in known manner into the corresponding 1,1'-disubstituted -4,4'- (or -2,2'-)-bipyridylium salts which are useful herbicides. Herbicides which can be produced in this way include:

1,1'-dimethyl-4,4'-bipyridylium dichloride, and
1,1'-ethylene-2,2'-bipyridylium dibromide.

The invention is illustrated but in no way limited by the following examples:

EXAMPLE 1

Experimental procedure

Distilled water and a methanolic solution of potassium hydroxide were placed in a 250 ml. round-bottomed flask. A supported palladium catalyst was added, followed immediately by hydrazine hydrate or hydroxylamine hydrochloride and a halopyridine or its hydrochloride. The mixture was heated under reflux conditions or maintained at the desired temperature for the desired period of time after which it was cooled to room temperature. The cooled mixture was filtered and the filtrate was analyzed for bipyridyls and pyridine by gas-liquid chromatography.

The amounts of reagents, the catalyst support, the reaction conditions and the results of analysis are shown for each experiment in the table, wherein HH represents hydrazine hydrate and HAC represents a hydroxylammonium chloride.

and analyzed for bipyridyls. 77% of the 4-chloropyridine was consumed. The yield of pyridine was 55% of theory and the yield of bipyridyl was 14% of theory.

EXAMPLE 4

Distilled water (10 ml.) was added to a solution of triethylamine (10.5 g.) in methanol (100 ml.) in a round-bottomed flask. Catalyst (5% Pd/Al$_2$O$_3$—1 g.) was added followed by hydrazine hydrate (1.2 g.) and 4-chloropyridine (10 g.). The mixture was heated under reflux at 65° C. for three hours after which time it was cooled

TABLE

| Ex. No. | Halopyridine (g.) | Additive (g.) | KOH/MeOH (ml.) | KOH (g.) | Water (ml.) | Catalyst | Gram | Temp. (° C.) | Time (hrs.) | Halopyridines converted (percent) | Pyridine eff. (percent) | Bipyridyl eff. (percent) |
|---|---|---|---|---|---|---|---|---|---|---|---|---|
| | 4-bromopyridine hydrochloride | | | | | | | | | | | |
| 1 | 12.3 | HH/1.2 | 100 | 9.6 | 10 | 5% Pd/CaCO$_3$ | 1 | 65 | 3 | 100 | 41 | 43.5 |
| 2 | 12.3 | HH/1.2 | 100 | 9.6 | 10 | do | 1 | 65 | 3 | 100 | 61 | 26 |
| 3 | 12.3 | HH/1.2 | 100 | 9.6 | 15 | do | 1 | 65 | 3 | 100 | 67 | 25 |
| 4 | 12.3 | HAC/1.2 | 100 | 11.4 | 10 | do | 1 | 65 | 1.5 | | 6 | 39 |
| | 4-bromopyridine | | | | | | | | | | | |
| 5 | 10 | HH/1.2 | 100 | 5.6 | 10 | do | 1 | 65 | 1.5 | 100 | 20 | 66 |
| 6 | 10 | HH/1.2 | 50 | 5.6 | 60 | do | 1 | 65 | 3 | 100 | 52 | 30.5 |
| 7 | 8 | HH/1.2 | 50 | 5.6 | 60 | 5% Pd/Al$_2$O$_3$ | 1 | 65 | 3 | | 14 | 63 |
| 8 | 10 | HH/0.6 | 100 | 5.6 | 10 | 5% Pd/CaCO$_3$ | 1 | 65 | 3 | | 22 | 53 |
| 9 | 10 | HH/1.2 | 100 | 5.6 | 10 | do | 1 | 0 | 3 | | 22 | 13 |
| 10 | 8.4 | HAC/0.9 | 100 | 5.6 | 10 | do | 0.54 | 65 | 3 | | 16 | 43 |
| | 4-chloropyridine | | | | | | | | | | | |
| 11 | 10 | HAC/1.7 | 100 | 7.6 | 10 | do | 1 | 65 | 3 | 59 | 12.5 | 20.5 |
| 12 | 10 | | 100 | 5.6 | 10 | 5% Pd/Al$_2$O$_3$ | 1 | 65 | 5 | 83 | 50 | 25 |
| 13 | 8.4 | HH/1.2 | 100 | 5.6 | 10 | 5% Pd/CaCO$_3$ | 2 | 65 | 3 | 94 | 22 | 35 |
| 14 | 10 | HH/0.6 | 100 | 5.6 | 10 | do | 1 | 65 | 1 | 82 | 12 | 37 |
| 15 | 10 | HH/1.2 | 100 | 5.6 | 10 | 5% Pd/Al$_2$O$_3$ | 1 | 65 | 5 | 100 | 17.5 | 37 |
| 16 | 6.7 | HH/0.84 | 50 | 2.8 | 5 | 5% Pd/CaCO$_3$ | 0.67 | 20 | 3 | 60 | 27 | 16 |
| 17 | 10 | HH/1.2 | 100 | 5.6 | 10 | 10% Pd/CaCO$_3$ | 0.5 | 65 | 3 | 92 | 30.5 | 38 |
| 18 | 10 | HH/1.2 | 100 | 5.6 | 10 | do | 1 | 65 | 2 | 65 | 22.5 | 24 |
| 19 | 10 | HH/1.2 | ¹100 | 5.6 | 10 | do | 1 | 78 | 3 | 66 | 53 | 7 |
| 20 | 10 | HH/1.2 | 100 | 5.6 | 10 | Pd black | 0.5 | 65 | 3 | 54 | 14 | 21.5 |
| 21 | 10 | HH/1.2 | ²100 | 11.2 | 75 | 5% Pd/CaCO$_3$ | 1 | 100 | 9 | 100 | 65 | 4 |
| 22 | 10 | HH/1.2 | ³100 | 5.6 | 10 | do | 1 | 140 | 5 | 100 | 30 | 26.5 |
| 23 | 11.8 | HH/1.2 | 100 | 5.6 | 10 | 5% Pd/Al$_2$O$_3$ | 1 | 65 | 3 | 68 | 26 | 32 |
| 24 | 10 | HH/1.2 | 100 | 5.6 | 10 | 5% Pd/BaSO$_4$ | 1 | 65 | 3 | 80 | 24 | 46 |
| 25 | 10 | HH/1.2 | 50 | 5.6 | 60 | 5% Pd/Al$_2$O$_3$ | 1 | 65 | 3 | 98 | 22 | 65 |
| 26 | 10 | HH/1.2 | 25 | 5.6 | 85 | 5% Pd/CaCO$_3$ | 1 | 80 | 3 | 58 | 36 | 14 |
| | 4-chloropyridine hydrochloride | | | | | | | | | | | |
| 27 | 12.5 | HH/1.2 | 100 | 9.6 | 10 | do | 1 | 65 | 3 | 33 | 30 | 7 |
| | 2-bromopyridine | | | | | | | | | | | |
| 28 | 10 | HH/1.2 | 100 | | 10 | 5% Pd/Al$_2$O$_3$ | 0.8 | Reflux | 3 | | 13 | 26.5 |
| 29 | 10 | HH/1.2 | 100 | | 10 | do | 0.8 | Reflux | 5.5 | | 18 | 27.5 |
| 30 | 10 | HH/1.2 | 50 | 2.8 | 50 | do | 0.8 | Reflux | 6 | | 21 | 23 |
| 31 | 10 | HH/1.2 | 100 | | 10 | do | 0.8 | Reflux | 5 | | 16 | 22 |

¹ ETOH/KOH.   ² Dioxan/KOH.   ³ (CH$_2$OH)$_2$.

EXAMPLE 2

Distilled water (2.5 ml.) was added to a solution (25 ml.) of potassium hydroxide (1.4 g.) in methanol in a Carius tube. A catalyst (5% Pd/CaCO$_3$—1 g.) was added, followed immediately by hydrazine hydrate (2.5 g.) and 4-chloropyridine (2.5 g.). The tube was sealed and its contents were heated at 100° C. for three hours. After this time the tube was cooled and opened and its contents were analyzed for bipyridyls by gas-liquid chromatography. 96% of the 4-chloropyridine had been consumed. The yield of pyridine was 40% of theory and the yield of bipyridyl was 44% of theory.

The above procedure was repeated except that the sealed tube was heated at 150° C. instead of 100° C. The halopyridine was completely consumed and the reaction efficiency was 24% in respect of pyridine and 32% in respect of bipyridyl produced.

EXAMPLE 3

Distilled water (60 ml.) was added to a solution in methanol (50 ml.) of calcium hydroxide (3.3 g.) in a round-bottomed flask. Catalyst (5% Pd/Al$_2$O$_3$—1 g.) was added followed by hydrazine hydrate (1.2 g.) and 4-chloropyridine (10 g.). The mixture was heated under reflux at 65° C. for three hours after which time it was cooled and analyzed for bipyridyls. 80% of the 4-chloropyridine was consumed. The yield of pyridine was 62% of theory and the yield of bipyridyl was 12% of theory.

EXAMPLE 5

Methanol (30 ml.) was added to a solution of potassium hydroxide (5.6 g.) in distilled water (20 ml.) in a 250 ml. round-bottomed flask. 0.5 g. of a catalyst (5% Pd/CaCO$_3$) was added, followed by hydrazine hydrate (0.6 g.) and 4-chloro-2-methylpyridine hydrochloride (5.0 g.). The resulting mixture was heated under reflux conditions, with stirring, for two hours, after which time it was cooled to room temperature and filtered. The filtrate was analyzed for bipyridyls and pyridines by gas/liquid chromatography. The mixture was found to contain 0.80 g. of 2-picoline (0.0086 mole; 28.2% efficiency) and 0.57 g. of 2,2'-dimethyl-4,4'-bipyridyl (0.0031 mole; 20.3% efficiency) which was soluble in water.

The reaction mixture was evaporated to dryness and the residue was treated with toluene. The toluene was removed by evaporation and the residue then was recrystallized from petrol ether solution. The resulting product was identified as 2,2'-dimethyl-4,4'-bipyridyl by comparison of its gas/liquid chromatograph retention time with that of an authentic sample.

Confirmation of the structure of the product was obtained by determining its mass, infrared, and nuclear magnetic resonance spectra.

The mass spectrum showed a parent molecular ion at M/e=184 corresponding to the expected structure.

The infra-red spectrum matched that of a standard reference sample of 2,2'-dimethyl-4,4'-bipyridyl.

The NMR spectrum of a solution of the product in acetone shows:

(i) An ABX system in the aromatic region corresponding to:

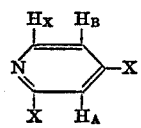

$\delta H_A$=7.56 p.p.m.
$\delta H_B$=7.45 p.p.m.
$\delta H_X$=8.54 p.p.m.

(ii) A singlet at $\delta$=2.58 p.p.m. corresponding to a methyl group in a position alpha with respect to the nitrogen atom in a pyridine.

An integral shows that the peak area ratio of (i) to (ii) is 1:1 so that the spectrum is consistent with that of 2,2'-dimethyl-4,4'-bipyridyl.

EXAMPLE 6

Methanol (30 ml.) was added to a solution of potassium hydroxide (5.6 g.) in distilled water (20 ml.) in a 250 ml. round-bottomed flask. Catalyst (5% Pd/CaCO₃— 0.5 g.) was added, followed by hydrazine hydrate (0.6 g.) and 4-chloro-3-methylpyridine hydrochloride (5.0 g.). The mixture was heated under reflux conditions, with stirring, for two hours after which time it was cooled to room temperature and filtered. The filtrate was analyzed by gas/liquid chromatography for pyridines and was found to contain 1.92 g. of 3-picoline (0.02065 mole; 67.7% efficiency). The methanol was then evaporated from the filtrate and the resulting solid 3,3-dimethyl-4,4'-bipyridyl was separated from the mixture by filtration. The amount of 3,3'-dimethyl-4,4'-bipyridyl obtained was 0.71 g. (0.003859 mole; 25.3% efficiency).

The structure of the product (3,3'-dimethyl-4,4'-bipyridyl) was confirmed by mass, infrared and NMR spectroscopy.

The mass spectrum showed a parent molecular ion at M/e=184 corresponding to the molecular formula of the expected product.

The NMR proton spectrum was consistent with the structure 3,3'-dimethyl-4,4'-bipyridyl and the infrared spectrum matched that of a standard reference sample of the expected product.

The NMR proton spectrum of a solution in acetone showed:

(i) An ABX system in an aromatic region corresponding to:

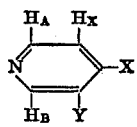

$\delta H_A$=8.55 p.p.m.
$\delta H_B$=8.65 p.p.m.
$\delta H_X$=7.09 p.p.m.

(ii) A singlet at $\delta$=2.10 p.p.m. compatible with CH₃— in a position beta to nitrogen in a pyridine ring. An integral shows the peak area ratio of (i):(ii) to be 1:1, so that the spectrum is consistent with the expected structure.

EXAMPLE 7

Sodium hydrochloride (10.0 g.), methanol (100 ml.), 4-chloropyridine hydrochloride (10.0 g.) and catalyst (5% Pd/Al₂O₃—1.0 g.) were mixed in a 250 ml. round-bottomed flask and the mixture was heated to 65° C. Hydrogen gas was passed through the solution at a constant rate of 10 l./hr. for 4 hours after which time the reaction mixture was filtered. The filtrate was analyzed for bipyridyl by gas/liquid chromatography. The amount of 4,4'-bipyridyl was found to be 0.78 g. (0.00500 mole; 15.0% efficiency).

The mass spectrum of the product showed a parent ion at M/e=156 and a fragmentation pattern consistent with that of 4,4'-bipyridyl.

The infra-red spectrum matched that of a standard 4,4'-bipyridyl dihydrate sample.

The NMR proton spectrum of an acetone solution showed:

(i) An AA'XX' system compatible with 4,4'-bipyridyl ($\delta$=7.8 and 8.8 p.p.m.).

(ii) A singlet at $\delta$=3.4 p.p.m. corresponding to —OH. An integral shows the ratio of (i):(ii) to be 2:1. Hence the spectrum is consistent with the expected product.

What is claimed is:

1. A process for the manufacture of 4,4'-bipyridyls and/or 2,2'-bipyridyls which comprises reacting at a temperature of at least 0° C. up to 150° C., a 4-halopyridine or a 2-halopyridine with an alkanol of up to six carbon atoms in the presence of a reaction medium which contains at least 0.025% by weight of a palladium catalyst per weight of the halopyridine and under basic conditions, said halopyridine being selected from the group consisting of chloro-, bromo- and iodo-pyridines.

2. A process as claimed in claim 1 wherein the reaction is carried out in the presence of an additive which is hydrazine or hydroxylamine.

3. A process as claimed in claim 2 wherein the amount of said additive is from 5% to 25% by weight based on the halopyridine.

4. A process as claimed in claim 1 wherein the reaction medium contains water.

5. A process as claimed in claim 5 wherein the amount of water is up to 50% by weight of the reaction medium.

6. A process as claimed in claim 1 wherein the reaction is carried out at a temperature of from 0° C. to 150° C.

7. A process as claimed in claim 1 wherein the temperature is from 50° C. to 80° C.

8. A process as claimed in claim 1 wherein the reaction medium contains an alkali-metal hydroxide.

9. A process as claimed in claim 1 wherein the halopyridine is generated in situ in the reaction medium.

10. A process as claimed in claim 1 wherein the alkali-metal hydroxide is potassium hydroxide.

11. A process as claimed in claim 1 wherein the amount of palladium is from 0.025% to 2% by weight based on the halopyridine.

12. A process as claimed in claim 1 wherein the amount of palladium is from 0.4% to 1% by weight based on the halopyridine.

13. A process as claimed in claim 1 wherein the palladium is carried on a support.

14. A process as claimed in claim 13 wherein the support is charcoal or an alkaline earth metal oxide or salt.

15. A process as claimed in claim 1 wherein the alkanol contains from 1 to 4 carbon atoms.

16. A process as claimed in claim 1 wherein the alkanol is methanol.

17. A process as claimed in claim 1 wherein the halopyridine is a monohalopyridine.

18. A process as claimed in claim 1 wherein the halopyridine is a 4-chloropyridine.

19. A process as claimed in claim 1 wherein the halopyridine is substituted by one or more methyl groups.

20. A process as claimed in claim 1 wherein the halopyridine is selected from the group consisting of 4-bromopyridine hydrochloride, 4-bromopyridine, 4-chloropyridine hydrochloride, 2-bromopyridine, 4-chloro-2-methyl-pyridine hydrochloride, and 4-chloro-3-methyl-pyridine hydrochloride.

References Cited

UNITED STATES PATENTS 3,651,071  3/1972  Bowden _____ 260—296 D

ALAN L. ROTMAN, Primary Examiner

U.S. Cl. X.R.

71—94